US012754538B2

(12) United States Patent
Wang et al.

(10) Patent No.: US 12,754,538 B2
(45) Date of Patent: Oct. 6, 2026

(54) GRAPH-DRIVEN PRODUCTION PROCESS MONITORING

(71) Applicant: Siemens Aktiengesellschaft, Munich (DE)

(72) Inventors: Lingyun Wang, Princeton, NJ (US); Arquimedes Martinez Canedo, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 354 days.

(21) Appl. No.: 18/576,765

(22) PCT Filed: Jul. 21, 2021

(86) PCT No.: PCT/US2021/042455
§ 371 (c)(1),
(2) Date: Jan. 5, 2024

(87) PCT Pub. No.: WO2023/003545
PCT Pub. Date: Jan. 26, 2023

(65) Prior Publication Data
US 2024/0385606 A1 Nov. 21, 2024

(51) Int. Cl.
*G05B 19/418* (2006.01)
*G06F 3/048* (2013.01)

(52) U.S. Cl.
CPC .................. *G05B 19/41885* (2013.01); *G05B 2219/31449* (2013.01); *G06F 3/048* (2013.01)

(58) Field of Classification Search
CPC .... G06F 3/0481; G06F 3/0482; G06F 3/0484; G06F 3/04842; G06F 3/04847; G05B 19/41885; G05B 2219/31449; G05B 2219/32131; G05B 23/0221; G05B 23/024
See application file for complete search history.

(56) References Cited

U.S. PATENT DOCUMENTS

| | | | | |
|---|---|---|---|---|
| 11,109,194 | B1 * | 8/2021 | Pinheiro | H04W 4/029 |
| 2017/0076207 | A1 * | 3/2017 | Chipley | G06Q 10/06375 |
| 2017/0102693 | A1 * | 4/2017 | Kidd | G05B 19/41865 |
| 2017/0102696 | A1 * | 4/2017 | Bell | G05B 23/0275 |

(Continued)

FOREIGN PATENT DOCUMENTS

| | | | |
|---|---|---|---|
| WO | 2020046261 | A1 | 3/2020 |
| WO | 2020198249 | A1 | 10/2020 |

*Primary Examiner* — Nicholas Klicos

(57) ABSTRACT

A system and method are disclosed for production process monitoring using graph learning. A production ontology is generated based on data received from an engineering design process, the ontology including selection of production machines, definition of a product, and workflow design. A production graph is instantiated based on the production ontology. Production process data is read from control systems of the production environment and the production graph is populated with the production process data to generate a time series of production graphs. Prediction information is received from historical production graphs of related production processes. Offline runtime analytics are performed on the production graph to yield analytics results including a plurality of predictors. The predictors include knowledge from the received prediction information leveraged with a weight sharing initialization.

13 Claims, 15 Drawing Sheets

(56) References Cited

U.S. PATENT DOCUMENTS

| | | | | |
|---|---|---|---|---|
| 2018/0357334 | A1* | 12/2018 | Chao | G05B 19/41885 |
| 2019/0121334 | A1* | 4/2019 | Song | G06N 20/00 |
| 2019/0158309 | A1* | 5/2019 | Park | H04L 12/2812 |
| 2019/0227534 | A1* | 7/2019 | Shimakawa | G05B 19/41885 |
| 2020/0012265 | A1* | 1/2020 | Thomsen | G06F 1/163 |
| 2021/0133659 | A1* | 5/2021 | Fujihira | G06Q 10/06375 |
| 2022/0057766 | A1* | 2/2022 | Cao | G05B 19/042 |
| 2022/0057788 | A1* | 2/2022 | Avireddi | G06N 20/00 |
| 2022/0171381 | A1* | 6/2022 | SayyarRodsari | G05B 17/02 |

* cited by examiner

FIG. 3
300
301
Conveyor Moves Tray to Loading Station
302
Operator loads WP onto Tray
303
Conveyor Moves Tray to Robot 101
304
Robot Removes WP From Tray
305
Robot Arrives at Inspection Station
306
Robot 101 Taken Out for Repair
307
Conveyor Moves Tray to Unloading Station
308
Operator Works at Unloading Station
309
Production Cycle Completed

GRAPH-DRIVEN PRODUCTION PROCESS MONITORING

TECHNICAL FIELD

This application relates to manufacturing technology. More particularly, this application relates to a graph-driven approach to production process monitoring in manufacturing.

BACKGROUND

Production monitoring is essential in manufacturing for optimizing productivity and efficiency of a production process. Today's production process monitoring technology is based on time series analysis of the data generated by the production system. For example, in a manufacturing execution system (MES)/supervisory control and data acquisition (SCADA) system, all production-relevant data (e.g., process values) are stored in a process historian database. Production monitoring applications are programmed in MES or SCADA systems using the data from the historian database.

In order to achieve efficient production monitoring, heavy programming and configuration are necessary, and multiple systems, such as Control Layer system, human machine interface (HMI) and MES, may be involved. Production monitoring is included as only one of several modules within a production code used to operate and control a production system. When a change in production monitoring is necessary (e.g., updating the production monitoring process to handle new process data related to modifications in the manufacturing machinery), HMI coding of the production code must be reprogrammed and redeployed. For example, HMI coding involves manual generation of multiple alarm screens in response to various events (e.g., process values exceeding allowable thresholds). In such cases, when new potential events are discovered, reprogramming of the HMI coding for a new alarm screen requires operation of the production system to be halted to allow the production code to be reprogrammed. Likewise, other aspects of production monitoring are based on a program of complex rules and logic imposed on process variables to detect faults, errors, and alarms at runtime, which lead to production interruptions when reprogramming is to be performed for updating to handle new configurations and events. A new production monitoring approach is needed that can operate during runtime without the need for reprogramming interruptions.

SUMMARY

Productivity of a manufacturing system is improved by a data-driven monitoring process. The data-driven approach enables cloud-based processing, with benefits including offline optimization of the production process, fault detection, predictive maintenance, and improvement of productivity key performance indicators (KPI) (e.g., overall equipment effectiveness (OEE) KPI).

In a system aspect, production process monitoring using graph learning is performed using a processor and a memory having modules stored thereon for execution by the processor. An ontology engine is configured to generate a production ontology based on data received from an engineering design process, the ontology including selection of production machines, definition of work products and workstations, and workflow design. A graph engine is configured to instantiate a production graph based on the production ontology, the production graph comprising graph nodes representing components of the production ontology, including production machines and work products, and graph edges to represent relationships between the components. The graph engine reads production process data from control systems of the production environment and populates the production graph with production process data in real time to generate a time series of production graphs. A human machine interface displays the time series of production graphs to reflect updated status of the production process including location of work products among the workstations. An analytics engine is configured to execute machine learning algorithms to extract trends from the time series of production graphs and generate one or more predictions of the production process based on the extracted trends. The analytics engine indicates the one or more predictions in the production graph.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

System and method are disclosed for process monitoring based on graph model data of the production process. The graph model is decoupled from the actual control and human machine interface (HMI) programs, and therefore the engineering effort is greatly reduced. An ontology is built using engineering data such as process diagrams, layouts, and configurations. An initial production process monitoring graph is instantiated from the ontology. During production, a time series of production process monitoring graphs are populated with production data. Compared to process monitoring state-of-the-art algorithms that use time series data only, the disclosed embodiments extract information from the structure in the graph derived from actual engineering data to derive insights from the process monitoring in a more efficient manner. This approach to process monitoring can be done in real-time and can provide improved visualization of the process monitoring along with prognostic and diagnostic information. As a result, the novel graph-driven approach for production monitoring disclosed herein improves the production process and minimizes the need for re-engineering of the monitoring algorithms.

In an embodiment, graphs are used to model factory assets (e.g., machines and products) and production processes (e.g., workflows). In a production monitoring graph, machines and products are represented by nodes, and their interactions (e.g., a machine operating on a work piece) are represented by edges. Production data such as process values are encoded as node and edge properties. In an embodiment, a production monitoring graph is built from engineering data, and populated from existing control systems such as PLC, HMI, and SCADA. The properties (process/tag values) of the nodes can be linked to the existing systems using Open communication interfaces (e.g., OPC UA, S7 communication). In an aspect, the graph evolves over time. As production progresses in time, the nodes and relationships change alongside the production. For example, as a product is treated by different machines, this can be modeled as the creation and removal of edges in the graph. The graph can be reprogrammed, engineered and deployed without interference to the production.

Figure 1:
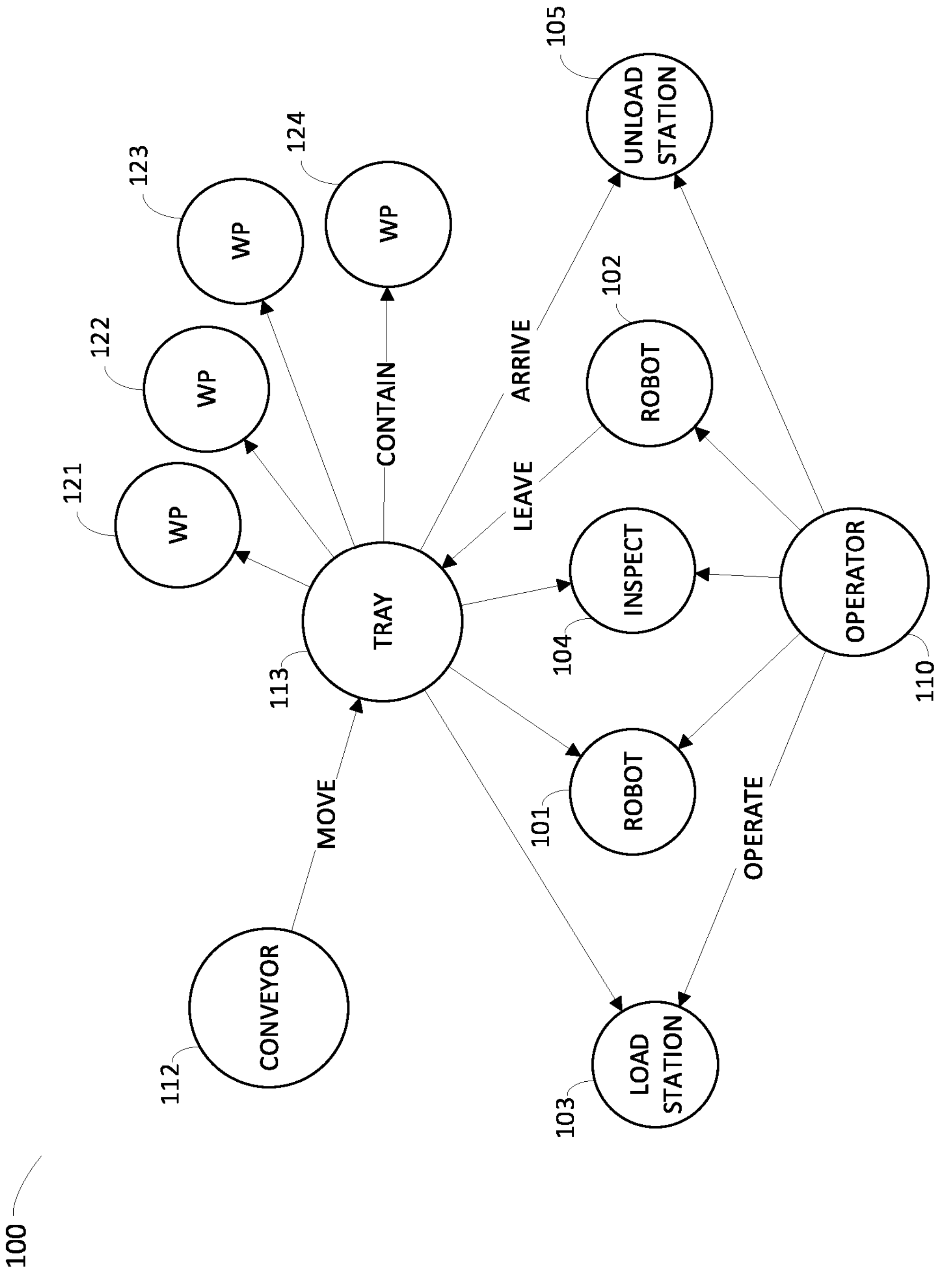
FIG. 1 shows an example of a model graph for a small production line in accordance with embodiments of the disclosure.

FIG. 1 shows an example of a model graph for a small production line in accordance with embodiments of the disclosure. Graph 100 represents a portion of a production process. In an embodiment, an initial model graph 100 is generated from an ontology developed during engineering stage of the production system. Each graph node represents an entity, including machines, a human operator, a tray and work products. In this example, machines include conveyor 112, loading station 103, assembly robots 101, 102, inspection station 104, and unloading station 105. Tray 113 is used to hold work products 121, 122, 123, 124. The relationships between the nodes are modeled as links between the nodes. Human/machine interactions are modeled in the graph operate links, which can have different subtypes indicating loading, unloading, assembling, repairing, etc. Tray 113 contains work products and can arrive and leave machines as indicated by the links. Conveyor 112 moves tray 113 along with work products 121, 122, 123, 124. The graph 100 intuitively models the production process including human interaction.

Figure 2:
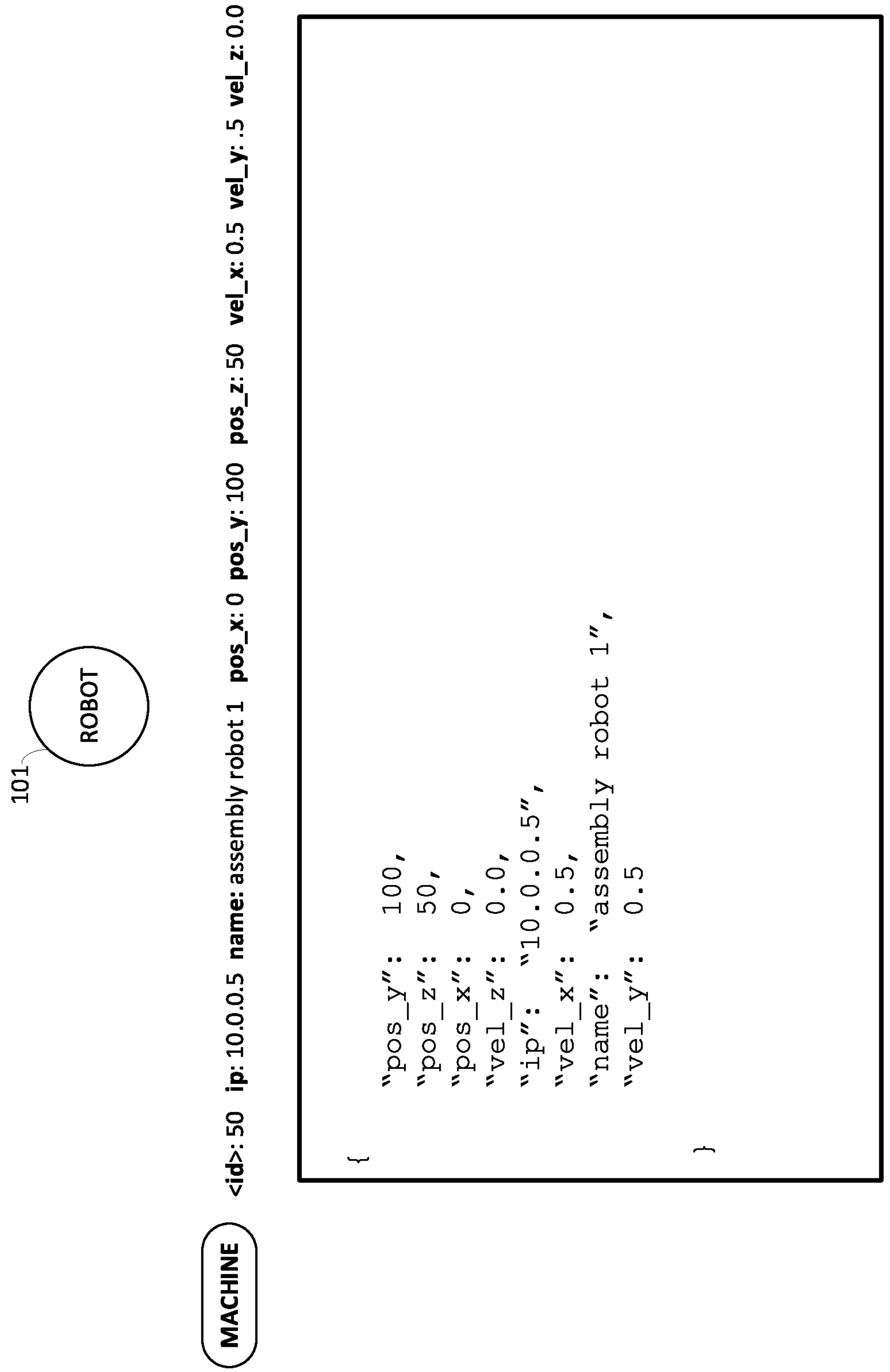
FIG. 2 shows an example for node properties of the production process graph in accordance with embodiments of this disclosure.

FIG. 2 shows an example for node properties of the production process graph in accordance with embodiments of this disclosure. In an embodiment, each graph node includes properties linked to process values. As shown in FIG. 2, robot 101 node represents a robot named "assembly robot 1" that has the properties of the positions (pos_x, pos_y, pos_z) and velocities (vel_x, vel_y, vel_z) of its arm. The property data of a graph node is updated in real time with corresponding process value. For this example, assembly robot 101 has properties for the arm positions (x,y,z) and its 6 degrees of velocities. The property data is updated with each time series of the graph as the process values are retrieved from sensors, shown in FIG. 2 as one snapshot in time, (e.g., (pos_y, pos_z, pos_x)=[100, 50, 0]). In an embodiment, process values can be overlayed on each node as a visual display to the user on an HMI. For example, the overlayed information can be normally hidden from view and then made to appear in response to a user interaction on a user interface, such as touching the graphical node (e.g., robot node 101) displayed on the screen.

Figure 3:
FIG. 3 shows a flowchart for an example of a production process in accordance with embodiments of this disclosure.
Figure 4:
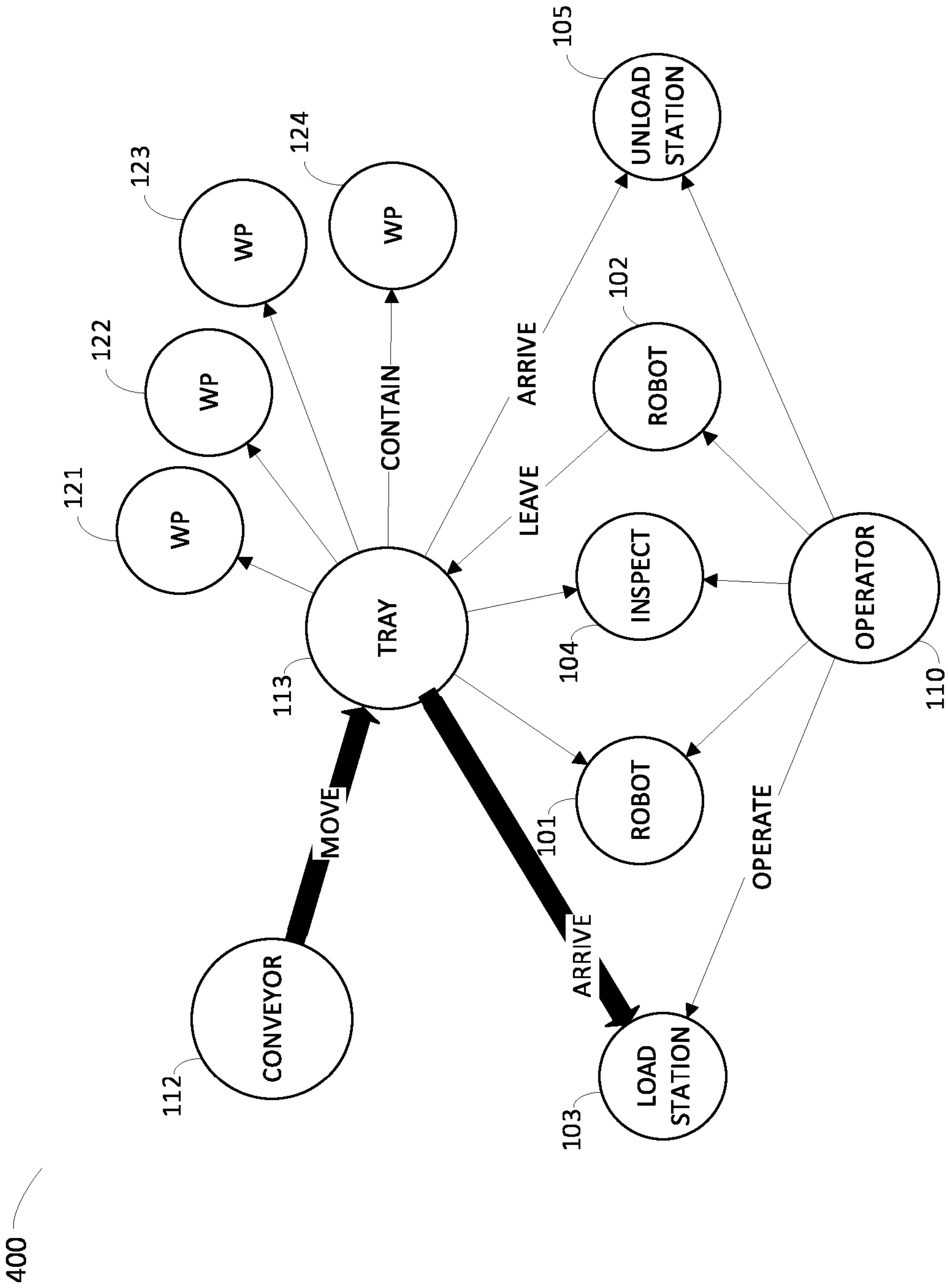
FIGS. 4-12 illustrate an example of a time series of model graphs in a production cycle in accordance with the process shown in FIG. 3.
Figure 5:
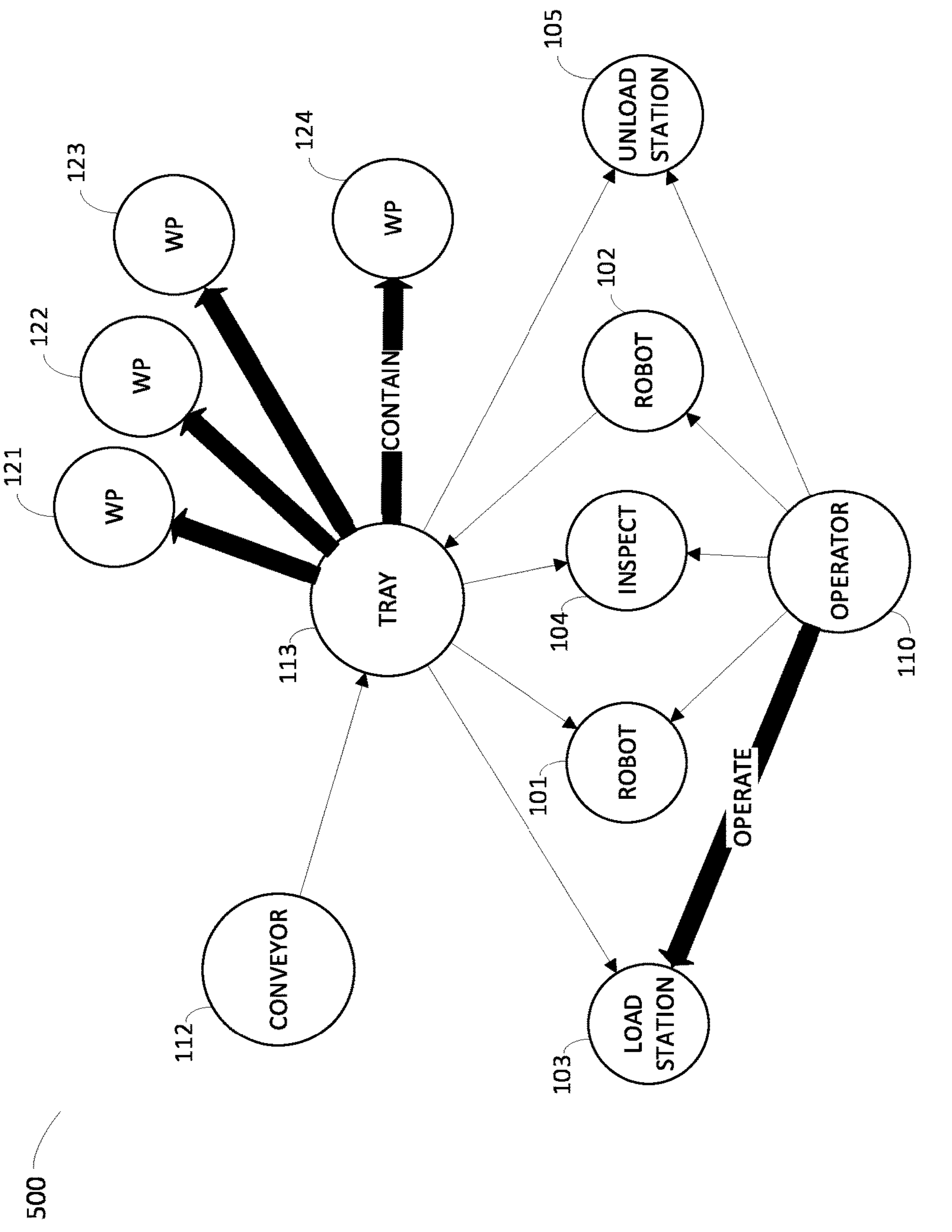
Figure 6:
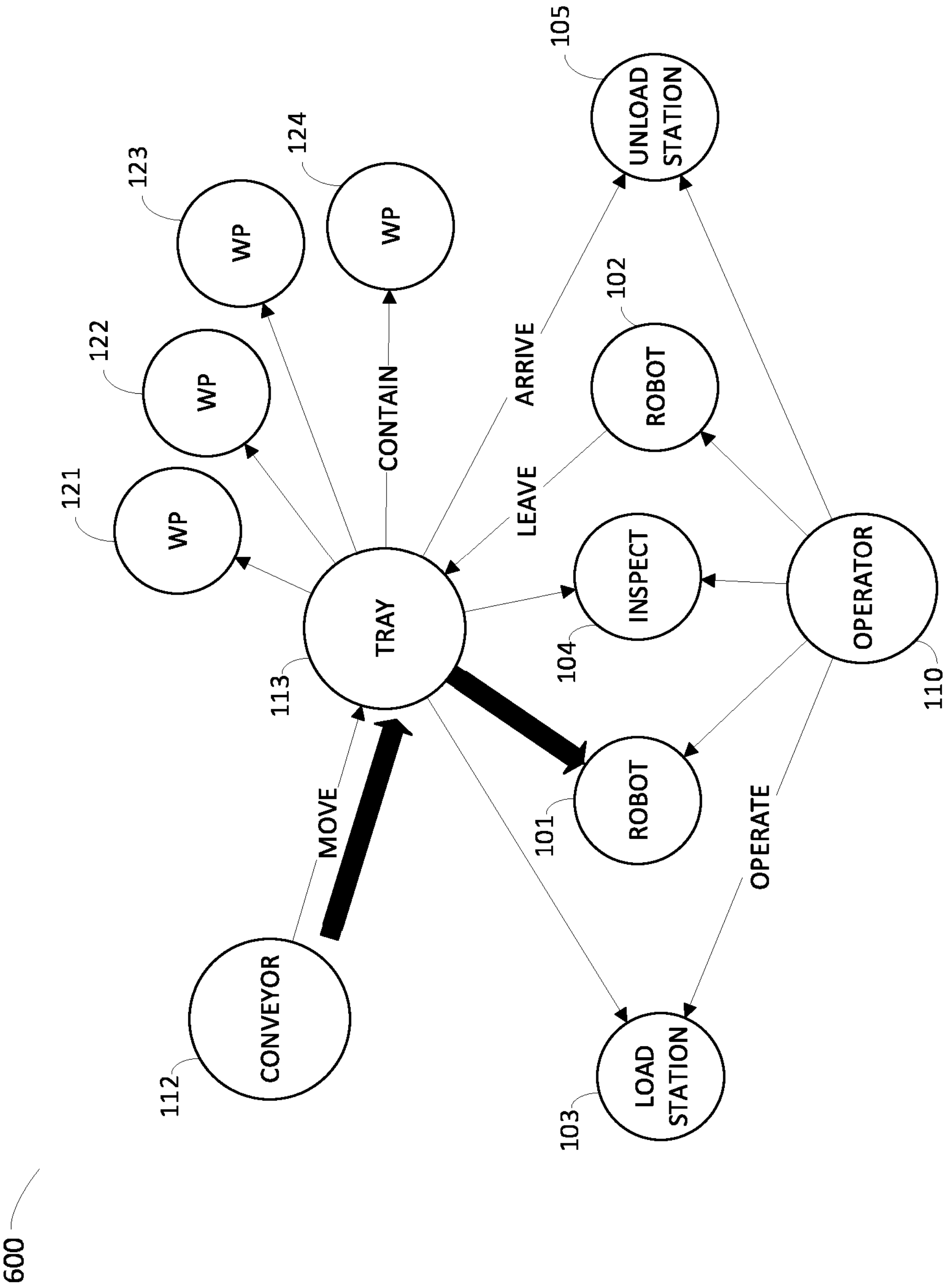
Figure 7:
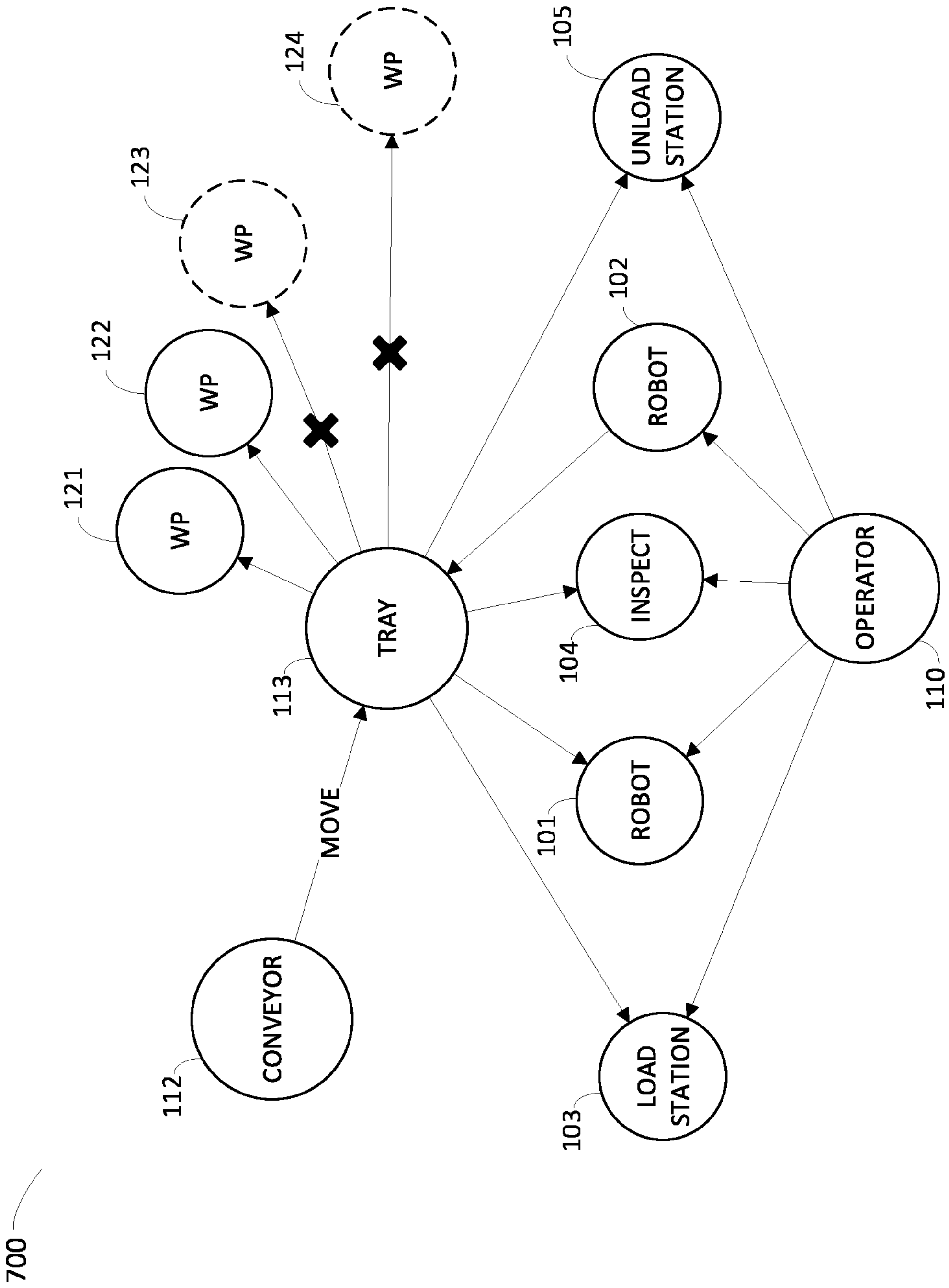
Figure 8:
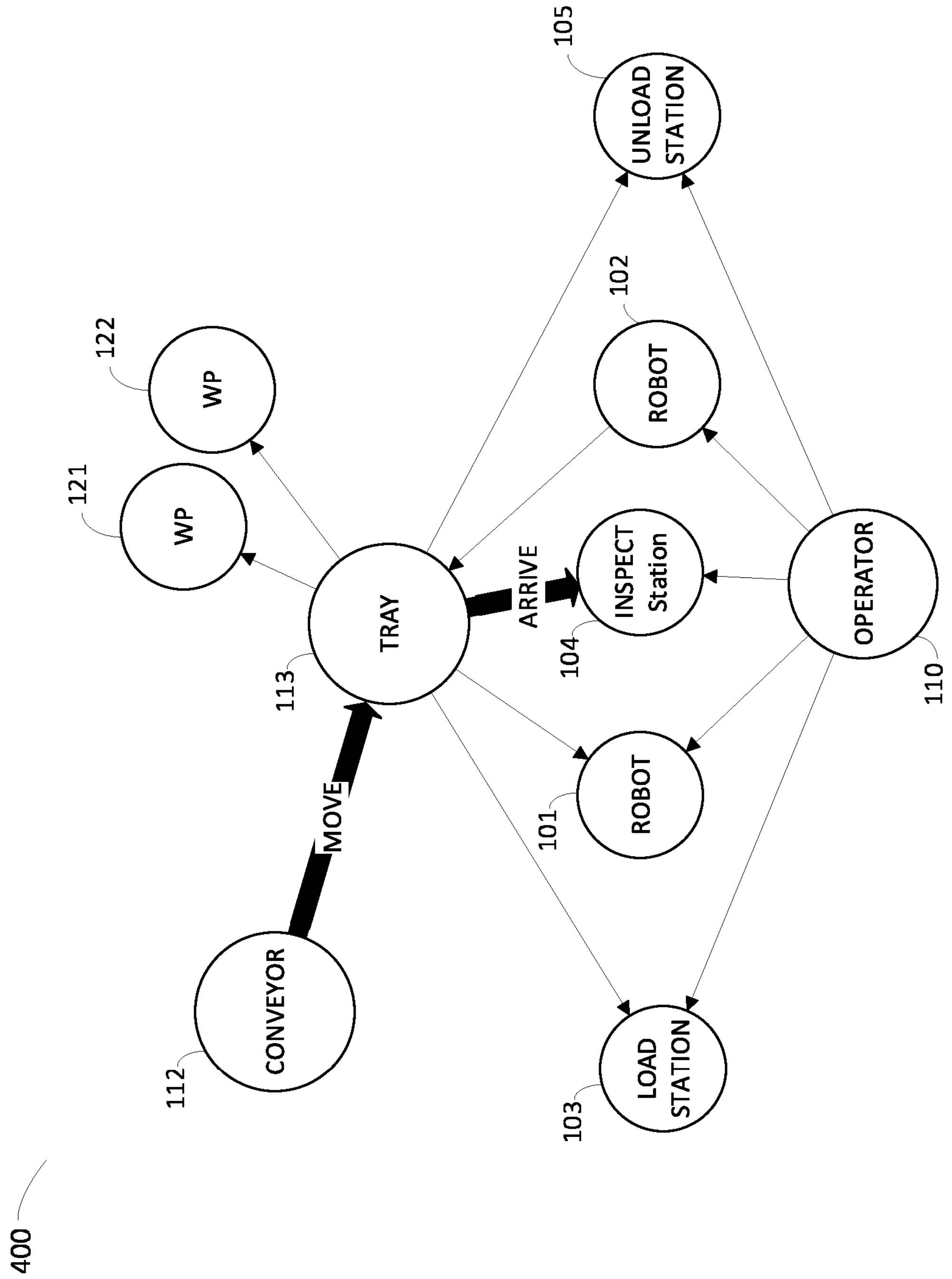
Figure 9:
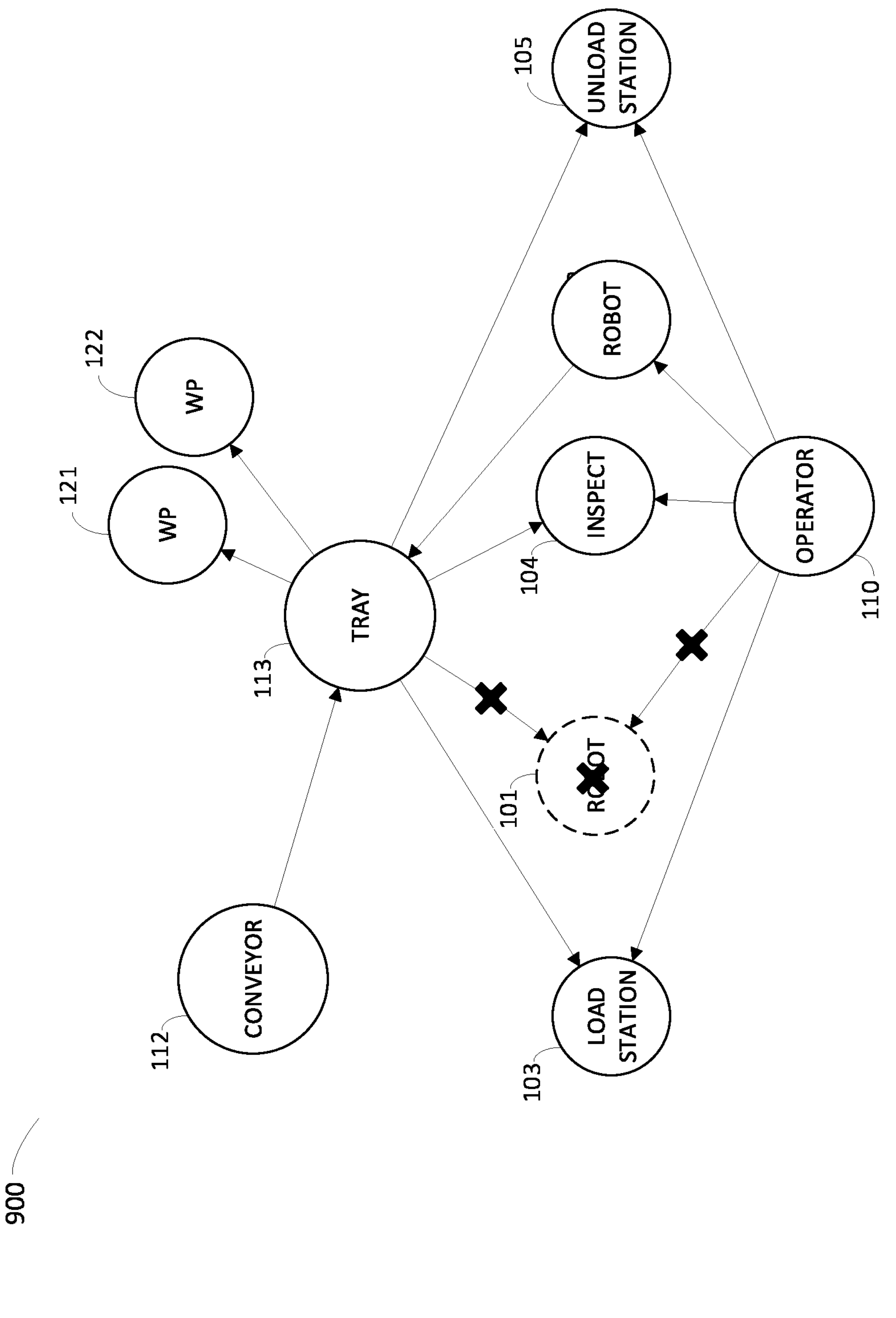
Figure 10:
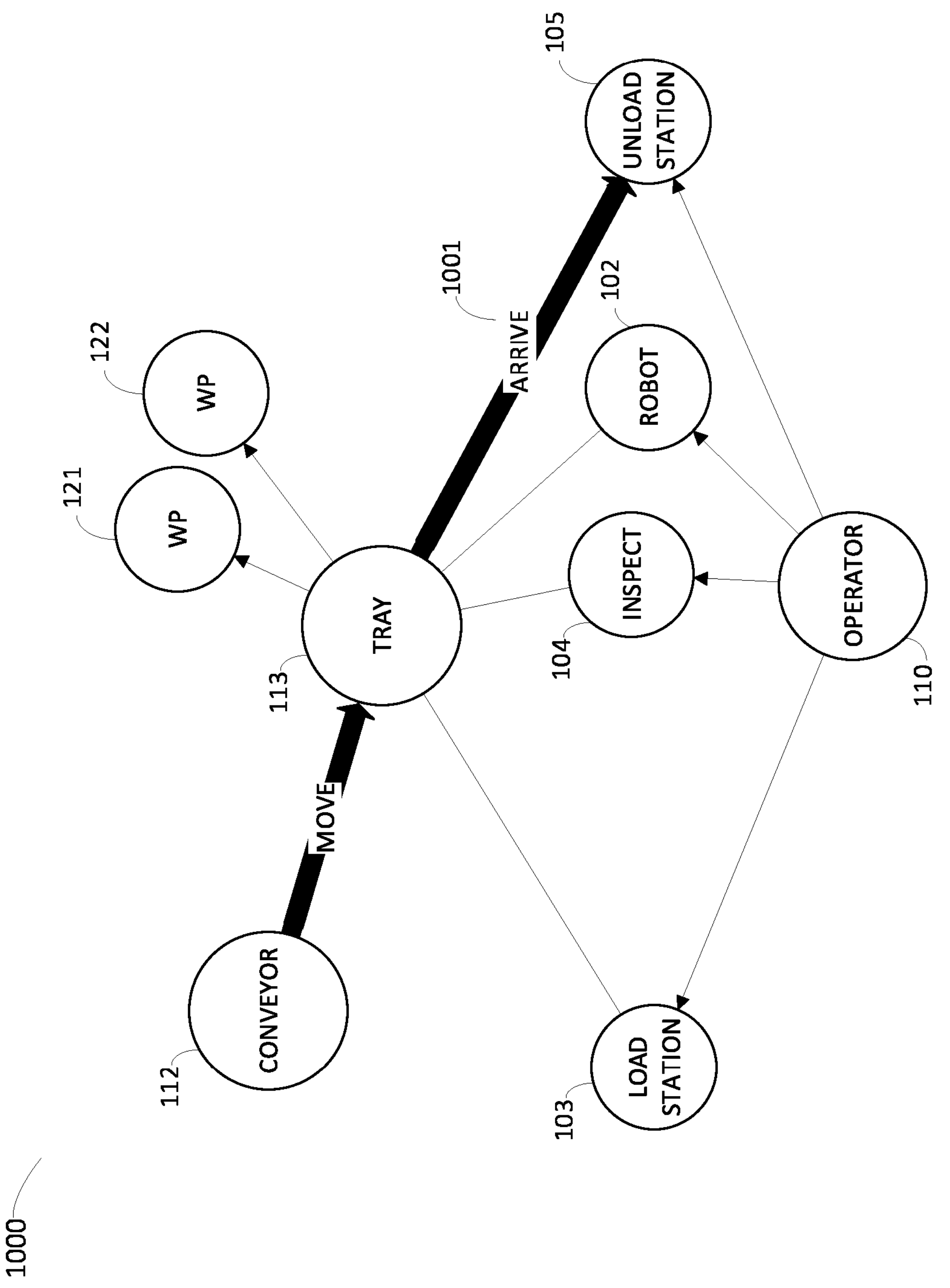
Figure 11:
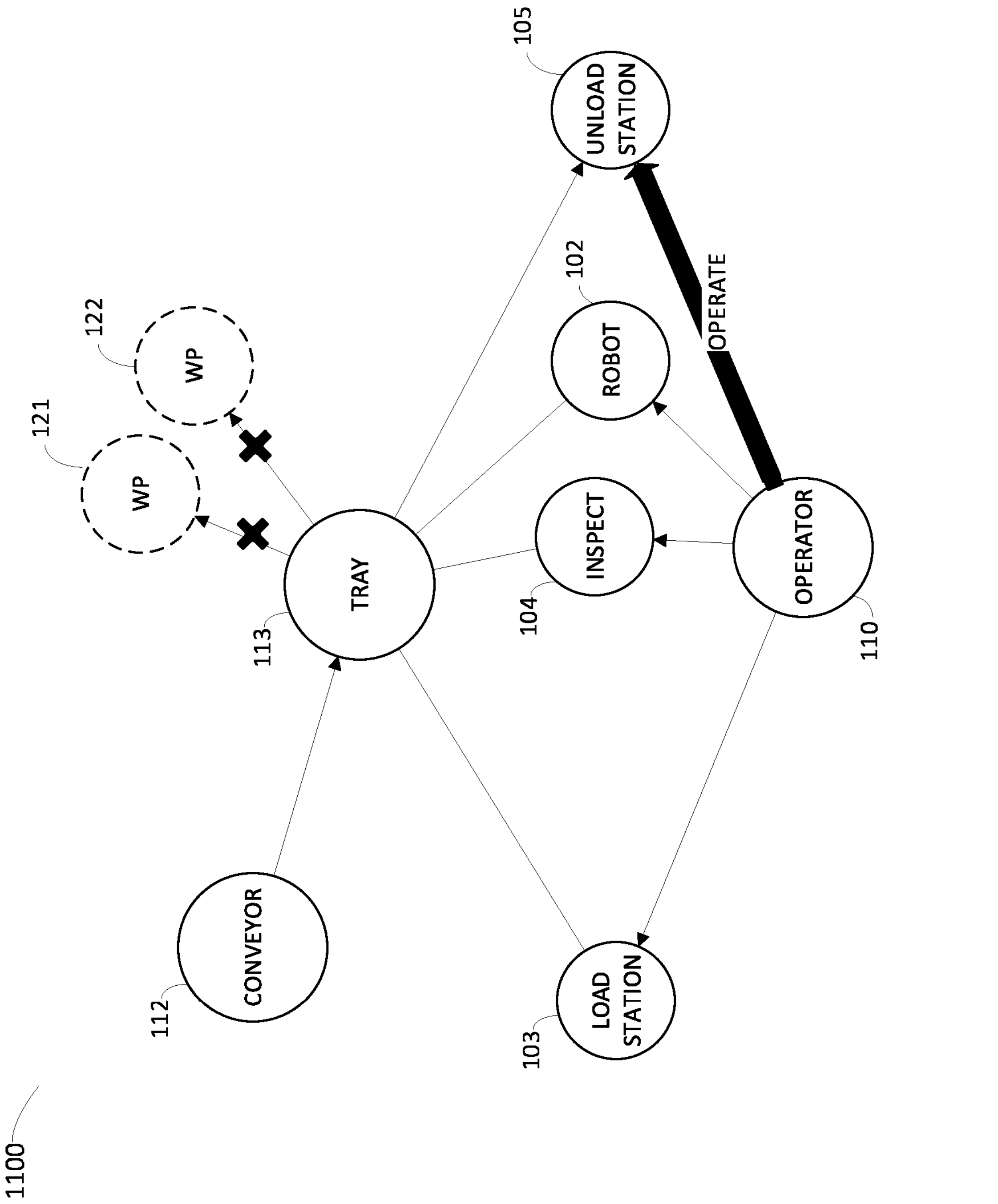
Figure 12:
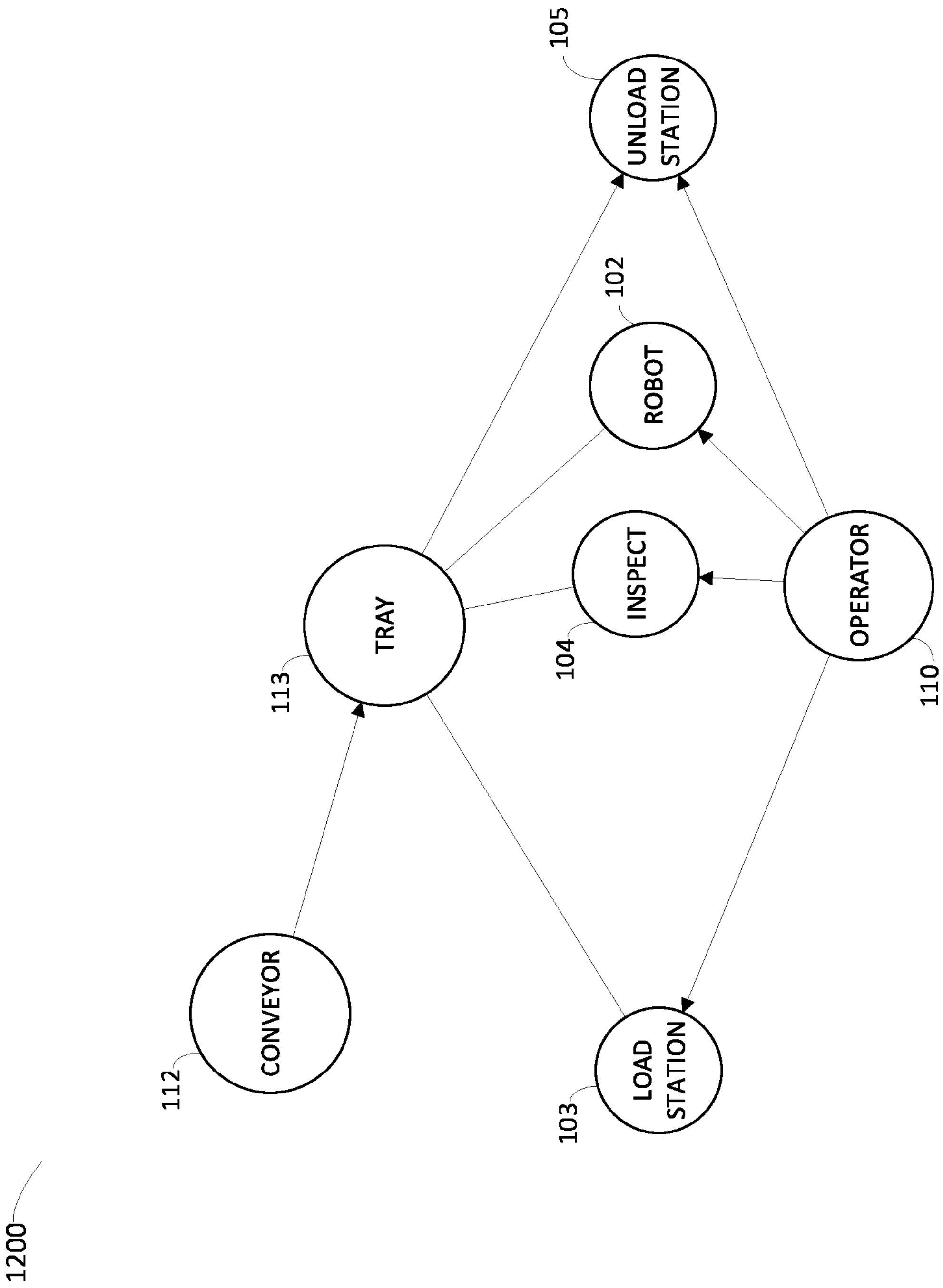

FIG. 3 shows a flowchart for an example of a production process in accordance with embodiments of this disclosure. FIGS. 4-12 illustrate an example of model graphs for a production cycle in accordance with the process shown in FIG. 3. As the production process progresses along various production stages, the model graph 100 is updated at regular time intervals to capture the updated information, yielding a time series of production process monitoring graphs. With each update, nodes are added and removed during operation to reflect states of machines and work product (e.g., work product being loaded or unloaded from a workstation, or a robot being added to the production line or removed for service). The links can also be activated and deactivated during production to reflect the current state of the production line configuration and interrelationship arrangement of objects. All of the graph data (nodes, links, properties of the nodes and links) are stored in a graph database (e.g., Neo4j) during the entire production. The snapshots of the graph data at any given time can be used as time series data for the graph.

To illustrate examples for the evolving nature of a time series of production process monitoring graphs, FIGS. 4-12 show a time series of graphs based on the initial graph shown in FIG. 1. A production monitoring process 300, as shown in FIG. 3, begins at 301 with conveyor 112 moving tray 113 to loading station 103 as shown by graph 400 in FIG. 4. Next at 302, operator 110 loads work product onto tray 113 at loading station 103, as shown by graph 500 in FIG. 5. Conveyor 112 moves tray 113 to robot 101 in step 303, shown in graph 600 of FIG. 6. Robot 101 removes work product 123, 124 from tray 113 at step 304, as shown by graph 700 of FIG. 7. At step 305, robot 101 arrives at inspection station 104, shown by graph 800 in FIG. 8. At step 306, robot 101 is taken out for service, as reflected in graph 900 of FIG. 9. Conveyor 112 moves tray 113 to unloading 105 station at step 307, shown in graph 1000 in FIG. 10. At step 308, operator 110 removes work products 121, 122 at the unloading station 105, reflected in graph snapshot 1100 of FIG. 11. At step 309, a production cycle is complete as shown by graph snapshot 1200 in FIG. 12. This time series of production process monitoring graphs may be displayed on an HMI to provide a useful visualization to a human operator. According to the disclosed embodiments, the HMI display is automatically generated as a graph based system, in contrast with having to manually program a series of HMI screens that react to process values and display alarm indications. With the graph-based HMI display as described herein, an operator is provided with a full context of the process with entities represented in a relational manner. The graphical display allows instant recognition of locating any detected problem in the production process, such as if one component has a faulty process value, the operator can see in an instant where to correct the problem. This is a significant improvement to state of the art HMI monitoring that consists of simple alarm indicators that a problem has been detected (e.g., a flag or textual line item indicating that a tank level reaching a minimum or maximum threshold limit, lacking the relational system reference).

In an embodiment, machine learning techniques are applied over dynamic graph data to discover new insights about the production. New insights can be learned over the regular production operation. One advantage from the disclosed embodiments is the discovery of new insights by the application of machine learning over the dynamic production monitoring graph. Targets for the machine learning algorithms may include production key performance indicators (KPIs) (e.g., throughput, OEE, downtime). New insights may include one or more of the following: (1) best production flow with least errors or worst production flows with most errors, (2) new connections/links between assets, (3) correlations between upstream and downstream components in a production line, (4) utilization of machines, (5) trend of movement of the product.

For example, a control program in a programmable logic controller (PLC) runs production logic that controls movement of a work product tray via conveyor and robotic grasp and transfer operations to different machine workstations where various production and assembly operations may be executed. In an arrangement such as shown in FIG. 1, where the sequence of operations is variable and redundant pathways are available for efficient production (e.g., multiple grinding and polishing stations to minimize backlog in a cue of work products on the production line), the production logic cannot readily be analyzed directly to determine the comparative degree of utilization for each of the machines. The real-world problem is greatly compounded as the scale of an actual production operation greatly exceeds that of the example provided in FIG. 1, simplified here for illustrative purpose. To address the complexity, an analytics engine is introduced which executes machine learning algorithms that extract trends from a time series of production graphs. Based on the extracted trends, the algorithm generates one or more predictions of the production process. For example, the analytics engine may predict the movement of the product to one or more production machine workstations and can inform the human operator of the prediction as a production assistance mechanism. In addition, the extracted trends can be analyzed for various benefits, including but not limited to identifying process problems and/or failures based on utilization of machines, prognostics for production machines, predicting production output, work product movement efficiency.

In an embodiment, the prediction is rendered graphically as a visualization cue for the user on the human machine interface (HMI) used for the production in the automation system. For example, with reference to the time series production graph shown in FIG. 12, before the tray 113 arrives at unload station 105, the prediction engine determines that the tray will likely arrive at unload station 105, and renders a form of indicator on the graph to alert the user of this prediction (e.g., the node for unload station 105 may be rendered in a different color, bold lines, flashing effect, or a combination thereof; the arrive arrow 1001 may be rendered with bold lines, different color, flashing effect, or a combination thereof). With such a prediction alert, the production process monitoring system can inform the user where and when to expect the next work product to assist the user to get ready for the machine and/or work product interaction.

Further advantages are afforded the operator by the graph-based production monitoring system, such as conveying process value information with the production process graph as a display on the HMI. For example, in an embodiment, the graph engine is configured to reveal process values in response to a human operator selecting a graph node on the HMI (e.g., selection may be by clicking on, touch of a touch screen, or hover over a graph node to reveal the process values). Alternatively, the graph engine can be configured to display one or more process values a graph component by default as an overlay on the respective graph node.

Figure 13:
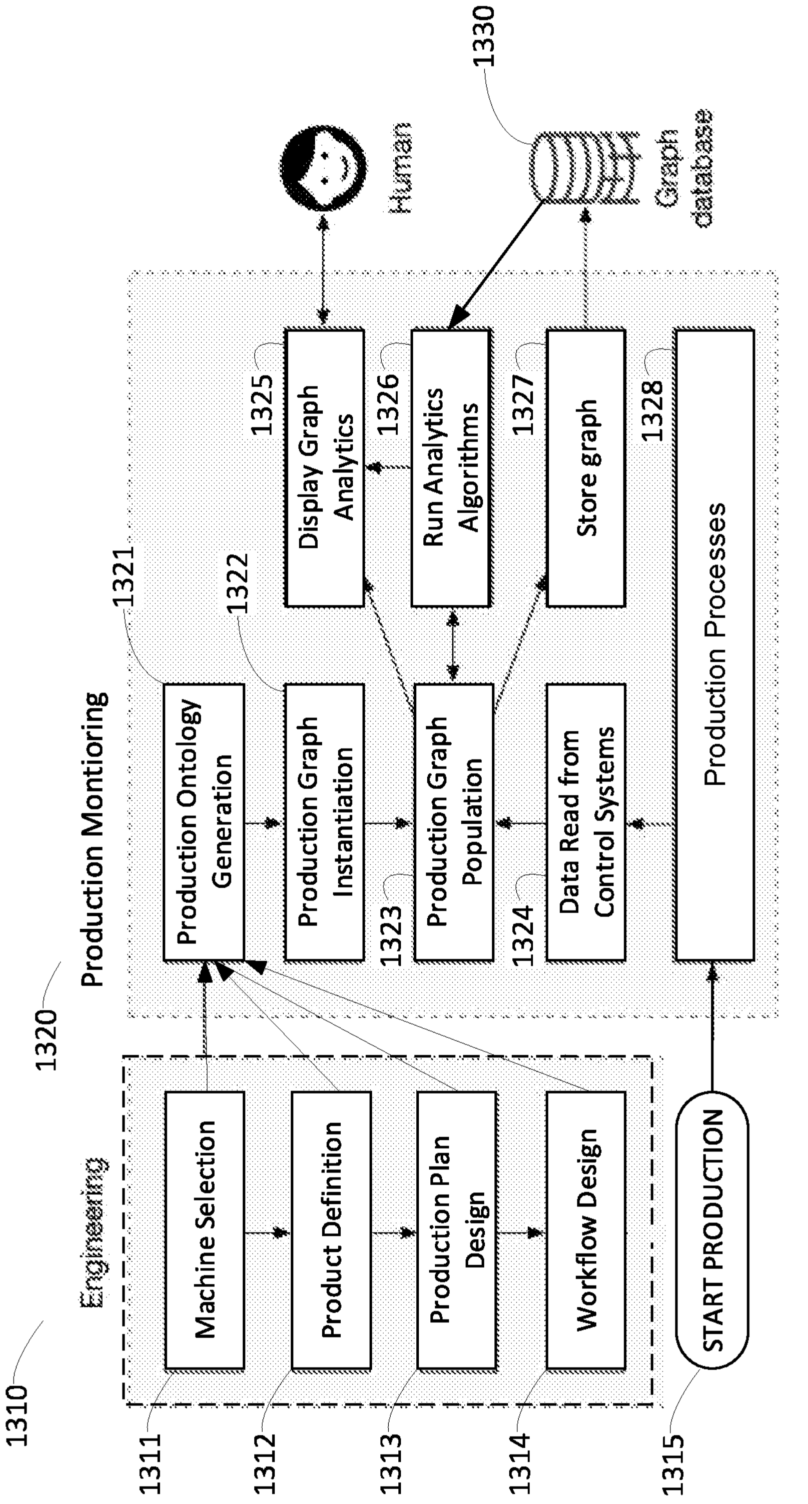
FIG. 13 shows a flow diagram for production process monitoring in accordance with embodiments of this disclosure.

FIG. 13 shows a flow diagram for production process monitoring in accordance with embodiments of this disclosure. Engineering activities 1310 include machine selection 1311, defining products to be produced 1312, designing of a production plan 1313, design of workflows 1314. Following these engineering activities, a start production trigger 1315 initiates the production process monitoring 1320. Production monitoring 1320 includes production processes 1328, generation of production ontology 1321, production graph instantiation 1322, production graph population 1323, reading data from control systems 1324, displaying graph analytics on HMI 1325, running analytics algorithms 1326, and storing graph 1327.

During engineering 1310, the production engineering data generated from the selection of machines 1311, definition of products 1312, production plan design 1313, and the workflow design 1314 is collected and used to generate a production ontology 1321. The production ontology is specific to a factory, and it provides the types of machines, products, their relationships, and their hierarchies. This ontology is used to instantiate a production graph 1322.

During production monitoring 1320, data from production processes 1328 is read from the control systems 1324 and it is used to populate the dynamic production graph 1323. An analytics engine runs analytics algorithms 1326 on the production graph to generate insights about the factory, machines, production process, and the product. In addition, analytics algorithms 1326 analyze historical production graphs stored in graph database 1330 that were generated for similar processes, machines and/or factories and transfers knowledge from the historical graphs to the new production graph. In an embodiment, analytics algorithms 1326 yield analytics results that include predictions (e.g., prognostics of production machines) and trends (e.g., which machines and process sequence variations yield the most efficient production of product). The results of the analytics can be fed back to the production graph or displayed 1325 on a user HMI for human interaction. In an aspect, the production graph is stored 1327 as a graph database 1330.

Figure 14:
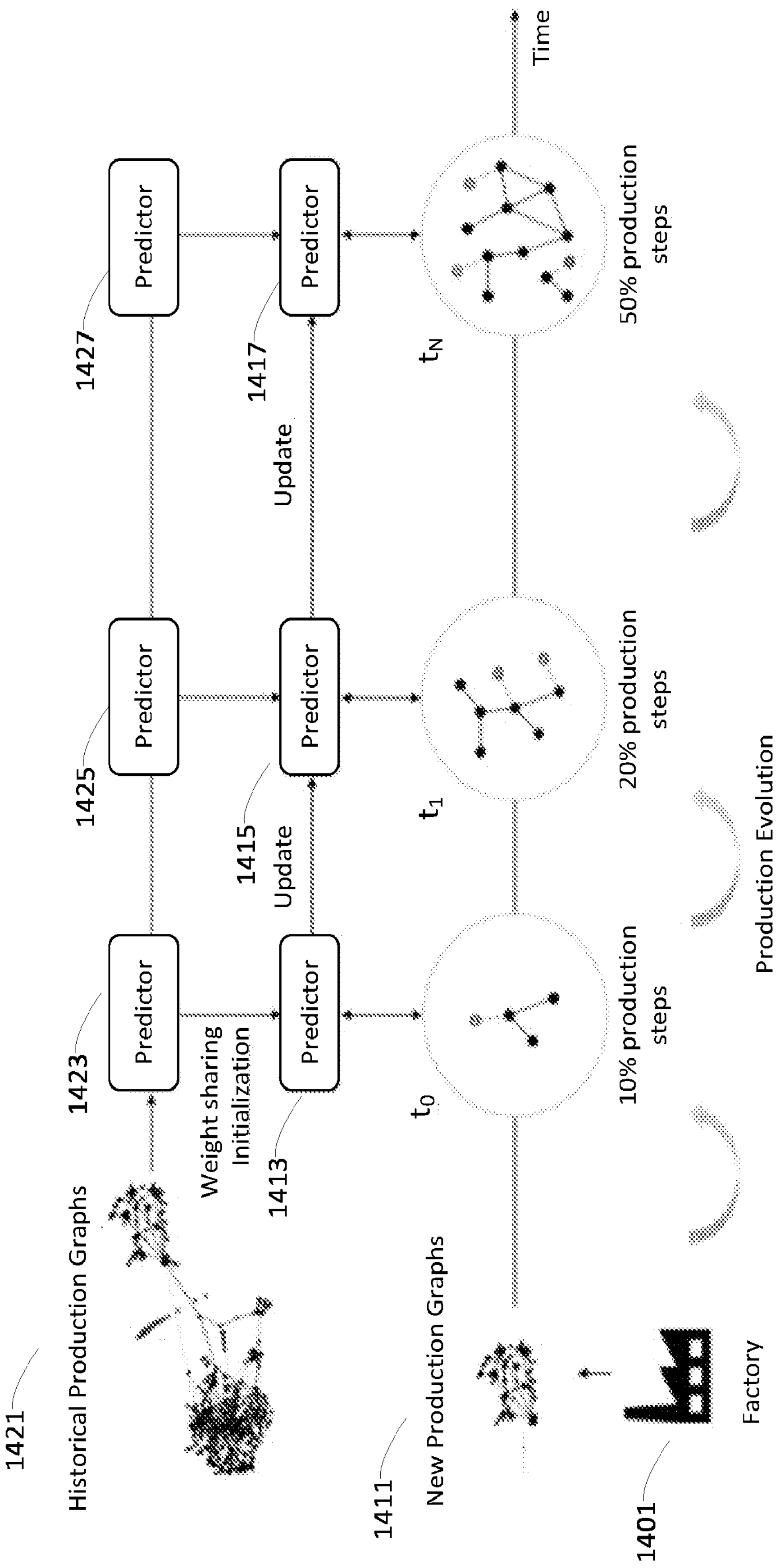
FIG. 14 illustrates an example of production graph generation using historical production graphs in accordance with embodiments of this disclosure.

FIG. 14 illustrates an example of production graph generation using historical production graphs in accordance with embodiments of this disclosure. In an aspect, a production graph for a new factory 1401 begins with a new production graph 1411. This initial production graph 1411 at time t0 is small and does not have much information. In this example, the initial production graph represents production data for 10% of production steps. Over time, as the production steps are executed, the production graph grows with more information as more production data is generated. For example, at time t1, the production graph 1411 may represent data from 20% of the production steps, and at time tN, the graph may represent data from 50% of the production steps. In order to improve the efficiency of the predictions (e.g., prognostics, errors), even with a small amount of production data, the production graph 1411 leverages historical production graphs (e.g., from similar processes, machines, and factories) and transfers this knowledge to the new production graph. For example, an analytics engine executes analytics algorithms on a time series of the historical production graphs to yield predictors 1423, 1425, 1427 for designated time intervals (t0, t1, tN), which may be different than the 10%, 20%, 50% production evolution stages as shown in FIG. 14. The analytics engine leverages each historical predictor 1423, 1425, 1427 into each predictor 1413, 1415, 1417 with a weight sharing initialization. This results in higher accuracy for predictions in the new factory even when the new graph is small. Without this, the graph would need to grow significantly before the predictions are accurate. As a result, the disclosed embodiments accelerate the time to generate predictions on new production lines.

A technical advantage provided by the disclosed embodiments is delivering accurate predictions for production process even with a small amount of information about the production process. Test results for the disclosed graph-based production process monitoring compared against a random prediction yield a performance improvement of 5:1 to 110:1 for observed links in a new graph ranging from 10% to 70%, respectively. The performance relative to random predictions increases super-linearly, hence the disclosed embodiments capture more graph structure with an increasing amount of data.

Additional advantages include the following. Machine learning algorithms for production monitoring based on time series require more data and take longer to execute compared to algorithms that use graph data. Graphs have inherent structure that can be exploited to accelerate the machine learning. Graphs are a good interface for humans to understand the production process. Nodes and relationships are intuitive when compared to time series data alone. Technical features applied herein include modeling of production data using graphs, generation of graph ontologies that are the basis for the production graph using engineering data from machines, product, configuration, and workflows, graph learning, and graph interface for HMI.

Figure 15:
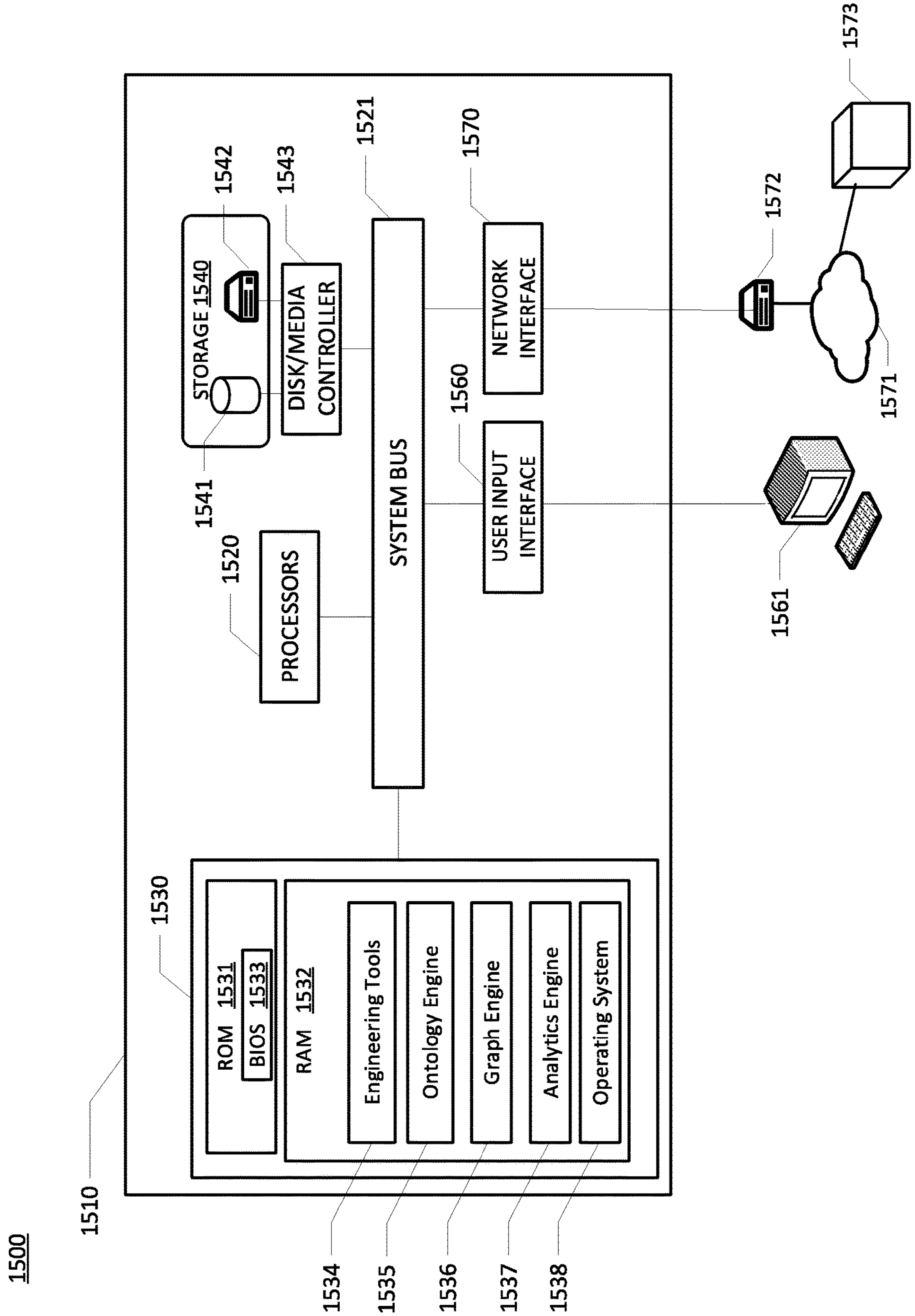
FIG. 15 illustrates an example of a computing environment within which embodiments of the present disclosure may be implemented

FIG. 15 illustrates an example of a computing environment within which embodiments of the present disclosure may be implemented. A computing environment 1500 includes a computer system 1510 that may include a communication mechanism such as a system bus 1521 or other communication mechanism for communicating information within the computer system 1510. The computer system 1510 further includes one or more processors 1520 coupled with the system bus 1521 for processing the information. In an embodiment, computing environment 1500 corresponds to a system for graph-based production process monitoring, in which the computer system 1510 relates to a computer described below in greater detail.

The processors 1520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 1521 may include at least one of a system bus, a memory bus, an address bus, or a message bus, and may permit exchange of information (e.g., data (including computer-executable code), signaling, etc.) between various components of the computer system 1510. The system bus 1521 may include, without limitation, a memory bus or a memory controller, a peripheral bus, an accelerated graphics port, and so forth. The system bus 1521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 15, the computer system 1510 may also include a system memory 1530 coupled to the system bus 1521 for storing information and instructions to be executed by processors 1520. The system memory 1530 may include computer readable storage media in the form of volatile and/or nonvolatile memory, such as read only memory (ROM) 1531 and/or random access memory (RAM) 1532. The RAM 1532 may include other dynamic storage device(s) (e.g., dynamic RAM, static RAM, and synchronous DRAM). The ROM 1531 may include other static storage device(s) (e.g., programmable ROM, erasable PROM, and electrically erasable PROM). In addition, the system memory 1530 may be used for storing temporary variables or other intermediate information during the execution of instructions by the processors 1520. A basic input/output system 1533 (BIOS) containing the basic routines that help to transfer information between elements within computer system 1510, such as during start-up, may be stored in the ROM 1531. RAM 1532 may contain data and/or program modules that are immediately accessible to and/or presently being operated on by the processors 1520. System memory 1530 additionally includes modules for executing the described embodiments, such as engineering tools module 1534, ontology engine 1535, graph engine 1536 and analytics engine 1537. With reference to FIG. 13, in an embodiment, engineering tools module 1534 is configured to generate engineering data such as machine selection 1311, product definition 1312, production plan design 1313, and/or workflow design 1314. Ontology engine 1535 is configured to generate production ontology 1321. Graph engine 1536 is configured to perform production graph instantiation 1322, and production graph population 1323. Analytics engine 1537 is configured to perform analytics 1326 on the production graph to yield predictions for the production process monitoring.

The operating system 1538 may be loaded into the memory 1530 and may provide an interface between other application software executing on the computer system 1510 and hardware resources of the computer system 1510. More specifically, the operating system 1538 may include a set of computer-executable instructions for managing hardware resources of the computer system 1510 and for providing common services to other application programs (e.g., managing memory allocation among various application programs). In certain example embodiments, the operating system 1538 may control execution of one or more of the program modules depicted as being stored in the data storage 1540. The operating system 1538 may include any operating system now known or which may be developed in the future including, but not limited to, any server operating system, any mainframe operating system, or any other proprietary or non-proprietary operating system.

The computer system 1510 may also include a disk/media controller 1543 coupled to the system bus 1521 to control one or more storage devices for storing information and instructions, such as a magnetic hard disk 1541 and/or a removable media drive 1542 (e.g., floppy disk drive, compact disc drive, tape drive, flash drive, and/or solid state drive). Storage devices 1540 may be added to the computer system 1510 using an appropriate device interface (e.g., a small computer system interface (SCSI), integrated device electronics (IDE), Universal Serial Bus (USB), or FireWire). Storage devices 1541, 1542 may be external to the computer system 1510.

The computer system 1510 may include a user input interface 1560 for communication with a graphical user interface (GUI) 1561, which may comprise one or more input devices, such as a keyboard, touchscreen, tablet and/or a pointing device, for interacting with a computer user and providing information to the processors 1520. In an aspect, the GUI 1561 relates to an HMI for displaying graphs, graph data, and/or analytics results as earlier described.

The computer system 1510 may perform a portion or all of the processing steps of embodiments of the invention in response to the processors 1520 executing one or more sequences of one or more instructions contained in a memory, such as the system memory 1530. Such instructions may be read into the system memory 1530 from another computer readable medium of storage 1540, such as the magnetic hard disk 1541 or the removable media drive 1542. The magnetic hard disk 1541 and/or removable media drive 1542 may contain one or more data stores and data files used by embodiments of the present disclosure. The data store 1540 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 1520 may also be employed in a multi-processing arrangement to execute the one or more sequences of instructions contained in system memory 1530. In alternative embodiments, hard-wired circuitry may be used in place of or in combination with software instructions. Thus, embodiments are not limited to any specific combination of hardware circuitry and software.

As stated above, the computer system 1510 may include at least one computer readable medium or memory for holding instructions programmed according to embodiments of the invention and for containing data structures, tables, records, or other data described herein. The term "computer readable medium" as used herein refers to any medium that participates in providing instructions to the processors 1520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 1541 or removable media drive 1542. Non-limiting examples of volatile media include dynamic memory, such as system memory 1530. Non-limiting examples of transmission media include coaxial cables, copper wire, and fiber optics, including the wires that make up the system bus 1521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 1500 may further include the computer system 1510 operating in a networked environment using logical connections to one or more remote computers, such as remote computing device 1573. The network interface 1570 may enable communication, for example, with other remote devices 1573 or systems and/or the storage devices 1541, 1542 via the network 1571. Remote computing device 1573 may be a personal computer (laptop or desktop), a mobile device, a server, a router, a network PC, a peer device or other common network node, and typically includes many or all of the elements described above relative to computer system 1510. When used in a networking environment, computer system 1510 may include modem 1572 for establishing communications over a network 1571, such as the Internet. Modem 1572 may be connected to system bus 1521 via user network interface 1570, or via another appropriate mechanism.

Network 1571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1510 and other computers (e.g., remote computing device 1573). The network 1571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1571.

It should be appreciated that the program modules, applications, computer-executable instructions, code, or the like depicted in FIG. 15 as being stored in the system memory 1530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 1510, the remote device 1573, and/or hosted on other computing device(s) accessible via one or more of the network(s) 1571, may be provided to support functionality provided by the program modules, applications, or computer-executable code depicted in FIG. 15 and/or additional or alternate functionality. Further, functionality may be modularized differently such that processing described as being supported collectively by the collection of program modules depicted in FIG. 15 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 15 may be implemented, at least partially, in hardware and/or firmware across any number of devices.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for production process monitoring using graph learning, comprising:

a processor; and a memory having modules stored thereon for execution by the processor, the modules comprising an ontology engine, a graph engine, a human machine interface, and an analytics engine, wherein:

the ontology engine is configured to generate a production ontology based on data received from an engineering design process, wherein the ontology includes selection of production machines, definition of work products and workstations, and workflow design;

the graph engine is configured to:

instantiate a production graph based on the production ontology, the production graph comprising nodes and edges, wherein the nodes represent components of the production ontology, including production machines and work products and the edges represent relationships between the components;

read production process data from control systems of the production environment; and populate the production graph with production process data in real time to generate a time series of production graphs;

the human machine interface is configured to display the time series of production graphs to reflect updated status of the production process including location of work products among the workstations;

the analytics engine is configured to:

execute machine learning algorithms to extract trends from the time series of production graphs;

generate one or more predictions of the production process based on the extracted trends;

indicate in the production graph the one or more predictions;

receive prediction information from historical production graphs of related production processes; and perform offline runtime analytics on the production graph to yield analytics results including a plurality of predictors, wherein the predictors include knowledge from the received prediction information leveraged with a weight sharing initialization.

2. The system of claim 1, wherein the extracted trends include machine utilization.

3. The system of claim 1, wherein the one or more predictions includes movement of the work product to one or more production machines.

4. The system of claim 1, wherein the one or more predictions includes prognostics for the production machines.

5. The system of claim 1, wherein the one or more predictions includes production output.

6. The system of claim 1, wherein the one or more predictions includes work product movement efficiency.

7. The system of claim 1, wherein the predictors include utilization of the production machines.

8. A computer based method for production process monitoring using graph learning, comprising:

generating a production ontology based on data received from an engineering design process, wherein the ontology includes selection of production machines, definition of work products and workstations, and workflow design;

instantiating a production graph based on the production ontology, the production graph comprising nodes and edges, wherein the nodes represent components of the production ontology, including production machines and work products and the edges represent relationships between the components;

reading production process data from control systems of the production environment;

populating the production graph with production process data in real time to generate a time series of production graphs;

displaying, on a human machine interface, the time series of production graphs to reflect updated status of the production process including location of work products among the workstations;

executing machine learning algorithms to extract trends from the time series of production graphs;

generating one or more predictions of the production process based on the extracted trends; and indicating in the production graph the one or more predictions, wherein the method further comprises:

receiving prediction information from historical production graphs of related production processes;

performing offline runtime analytics on the production graph to yield analytics results including a plurality of predictors, wherein the predictors include knowledge from the received prediction information leveraged with a weight sharing initialization.

9. The method of claim 8, wherein the extracted trends include machine utilization.

10. The method of claim 8, wherein the one or more predictions includes movement of the work product to one or more production machines.

11. The method of claim 8, wherein the one or more predictions includes prognostics for the production machines.

12. The method of claim 8, wherein the one or more predictions includes production output or work product movement efficiency.

13. The method of claim 8, wherein the predictors include utilization of the production machines.

* * * * *